United States Patent [19]

Nakamoto et al.

[11] Patent Number: 4,745,168

[45] Date of Patent: May 17, 1988

[54] PLASTIC LENS AND METHOD OF MANUFACTURING THEREOF

[75] Inventors: Hideo Nakamoto; Hiroshi Fukushima, both of Nagoya, Japan

[73] Assignee: Mitsubishi Rayon Co., Ltd., Tokyo, Japan

[21] Appl. No.: 896,571

[22] Filed: Aug. 18, 1986

Related U.S. Application Data

[63] Continuation of Ser. No. 693,042, Jan. 22, 1985, abandoned.

[30] Foreign Application Priority Data

Jan. 27, 1984 [JP] Japan ................................. 59-14136
Sep. 28, 1984 [JP] Japan ................................. 59-20397

[51] Int. Cl.$^4$ .................. C08F 18/02; C08F 18/18
[52] U.S. Cl. .................... 526/320; 526/322; 526/323.1; 526/75
[58] Field of Search ............... 526/292.4, 322, 323.1, 526/320, 75

[56] References Cited

U.S. PATENT DOCUMENTS

| | | | |
|---|---|---|---|
| 2,631,141 | 3/1953 | Swern et al. | 526/322 |
| 3,385,836 | 5/1968 | Mednick et al. | 526/322 |
| 4,393,184 | 7/1983 | Tauni et al. | 526/261 |
| 4,522,993 | 6/1985 | Jasagawa et al. | 526/292.4 |

FOREIGN PATENT DOCUMENTS

| | | |
|---|---|---|
| 58-201812 | 10/1982 | Japan . |
| 59-8709 | 1/1984 | Japan . |
| 59-081318 | 5/1984 | Japan .................... 526/322 |
| 59-96113 | 6/1984 | Japan . |
| 2133023 | 7/1984 | United Kingdom . |

Primary Examiner—Joseph L. Schofer
Assistant Examiner—Peter F. Kulkosky
Attorney, Agent, or Firm—Brumbaugh, Graves, Donohue & Raymond

[57] ABSTRACT

A plastic lens having a refractive index of not less than 1.55, comprising a polymer formed from dimethallyl phthalate as major monomeric constituent and, if necessary, one or more monomers represented by the general formula

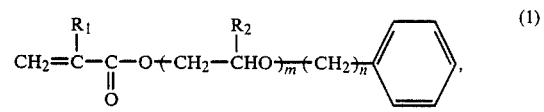

wherein $R_1$ and $R_2$ represent each a hydrogen atom or methyl group and m and n represent each an integer of from 0 to 3, or

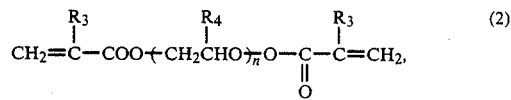

wherein $R_3$ and $R_4$ represent each a hydrogen atom or methyl group and n represents an integer of from 2 to 9. A method for manufacturing such a lens is also disclosed.

10 Claims, No Drawings

PLASTIC LENS AND METHOD OF MANUFACTURING THEREOF

This application is a continuation of application Ser. No. 693,042, filed on Jan. 22, 1985, now abandoned.

BACKGROUND OF THE INVENTION

1. Field of the Invention

This invention relates to plastic lenses having a high refractive index of not less than 1.55 and excellent properties in visible light transmission in processability, impact resistance, and dyeability. It relates also to a method for manufacturing such lenses.

2. Description of the Prior Art

In recent years, plastic lenses have become widely used in optical instruments, since they are lighter in weight, less fragile and more readily colored in comparison with inorganic glass lenses. Especially, in the case of eyeglass lenses, light-weight lenses are desirable, because the total weight of a pair of lenses is important from both physiologic and optical viewpoints. This is one of the main reasons for the recent widespreading tendency of plastic lenses. The leading resin presently used for eyeglass lenses is a polymer of diethylene glycol bisallylcarbonate (commonly called CR-39, Trademark for PPG Industries Co.). Since the specific gravity of the above polymer (1.32) is smaller than that of inorganic glass lenses (2.54), it is possible to reduce to a great extent the weight of lenses when this polymer is used. The above polymer, however, has a refractive index of 1.50 which is smaller than that ($n_D=1.52$) of inorganic glass lenses. As a consequence, it is necessary to increase the central thickness, peripheral thickness and curvature of the lenses made of this polymer, as compared with inorganic glass lenses. Accordingly, development of a transparent polymer having a higher refractive index has been eagerly awaited. Polycarbonate ($n_D=1.58$) and polystyrene ($n_D=1.60$) are known popularly as polymers having high refractive indices. Moreover, the use of these polymers in optical field is limited to comparatively small areas owing to their disadvantages such as unsatisfactory grinding processability, low scratch resistance due to insufficient surface hardness, and low resistance to organic solvents.

The proposed methods for providing three-dimensionally crosslinked plastic lens materials having high refractive indices include those which employ as major constituents (1) di(meth)acrylates derived from bisphenol-A [Japanese Patent Application "Kokai" (Laid-open) No. 116,301/83], (2) di(meth)acrylates derived from halogenated bisphenol-A [Japanese Patent Application "Kokai" (Laid-open) No. 10,491/82], (3) a combination of a halogenated styrene monomer and a polyfunctional methacrylate [Japanese Patent Application "Kokai" (Laid-open) Nos. 104,101/82, 28,118/82, and 28,116/82], and (4) a diallyl phthalate monomer [Japanese Patent Application "Kokai" (Laid-open) Nos. 212,401/82 and 15,513/83]. However, the method (1) provides with difficulty three-dimensionally cross-linked plastics having a refractive index of not less than 1.55. The methods (2), (3), and (4) provide three-dimensionally crosslinked plastics having a refractive index of not less than 1.55, but these plastics tend to discolor during the cast polymerization and are unsatisfactory also in weatherability and visible light transmission. In general, multifunctional (meth)acrylates cannot be purified by distillation; and, in addition, they contain polymerization inhibitors to improve the storage stability and are difficult to alleviate discoloration of the cured products caused by said inhibitors during the cast-polymerization.

OBJECT OF THE INVENTION

The present inventors carried out an extensive investigation to develop highly refractive three-dimensionally crosslinked plastic lenses having none of the aforementioned defects. As a result, it was found that a polymer comprising a dimethallyl phthalate as major component has a high refractive index and is satisfactory in visible light transmission, grinding processability, and impact resistance. The present invention is predicated upon this discovery.

CONSTITUTION OF THE INVENTION

The term "dimethallyl phthalate", as herein used, means dimethallyl o-phthalate, dimethallyl isophthalate, and dimethallyl terephthalate. In practicing this invention, these monomers are used each alone or in mixtures. The dimethallyl phthalate has a number of features. First, it can be purified by distillation and can be stored for a long term at room temperature without addition of a polymerization inhibitor such as hydroquinone or the like. Second, it exhibits heat of polymerization as less as about one-half or less compared with CR-39. Third, the shrinkage upon polymerization and curing is 11.8% which is smaller than that (about 14%) of CR-39. Fourthly, the specific gravity of its cured material is 1.22, which is considerably small as compared with that of CR-39 (1.32). These features of dimethallyl phthalate are favorable to the manufacture of optical lenses and are desirable for the lens material. The first feature enables the dimethallyl phthalate to provide a lens material excellent in visible light transmission and free of discoloration. The second feature makes it possible to provide more precisely molded articles by cast polymerization than the case with CR-39. The third feature is an advantage of the dimethallyl phthalate over CR-39 in reducing the percent defective, that is, increasing the productivity in lens manufacturing. The fourth feature allows the dimethallyl phthalate to produce articles much lighter in weight than those produced from CR-39.

The plastic lenses of the present invention consists essentially of a polymer formed from the dimethallyl phthalate as major component. This polymer is not necessarily a homopolymer, but can be a copolymer of the dimethallyl phthalate with other monomers so long as the performance of lenses is not deteriorated. Especially suitable comonomers are (meth)acrylates represented by the general formula (1),

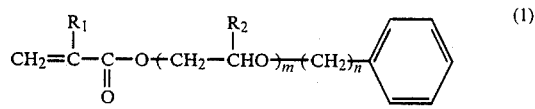

wherein $R_1$ and $R_2$ represent each a hydrogen atom or methyl group and m and n represent each an integer of from 0 to 3. As examples of said monomers, mention may be made of phenyl acrylate, phenyl methacrylate, benzyl acrylate, benzyl methacrylate, phenoxyethyl acrylate, phenoxyethyl methacrylate, phenoxypropyl acrylate, and phenoxypropyl methacrylate. Of these monomers, the most effective one is phenoxyethyl methacrylate. Also suitable are (meth)acrylates represented by the general formula (2),

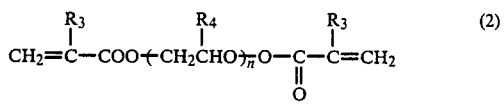

wherein $R_3$ and $R_4$ represent each a hydrogen atom or methyl group and n represents an integer of 2 to 9. As examples of said monomers, mention may be made of diethylene glycol di(meth)acrylate, triethylene glycol di(meth)acrylate, tetraethylene glycol di(meth)acrylate, and polyethylene glycol di(meth)acrylate, dipropylene glycol di(meth)acrylate, tripropylene glycol di(meth)acrylate, tetrapropylene glycol di(meth)acrylate, polypropylene glycol di(meth)acrylate.

The copolymerization of the dimethallyl phthalate with the above comonomers results in improvement of the dyeability of the resulting polymer without accompanying a decrease in refractive index ($n_D$). In carrying out the copolymerization, it is desirable to use 70 to 99% by weight of the dimethallyl phthalate and 30 to 1% by weight of the comonomer represented by the general formula (1) or (2). If dimethallyl phthalate is below 70% by weight, the visible light transmission becomes decreased, while if it exceeds 99% by weight, the dyeability of the lens becomes inferior to some degrees.

In carrying out the method of the present invention for manufacturing plastic lenses from a dimethallyl phthalate and a comonomer represented by the general formula (1) or (2), it is preferable to prepolymerize the dimethallyl phthalate in order to improve the productivity as well as to decrease the percent defective. Dimethallyl phthalates can be easily prepolymerized in the presence of a radical polymerization initiator. For instance, polymerization of dimethallyl o-phthalate proceeds without gelation until the conversion reached 30%, whereas with CR-39 gelation takes place at the conversion of 19%. With the increase in conversion of dimethallyl phthalate, the viscosity of polymerization system increases proportionately.

In a preferred embodiment of this invention, at first dimethallyl phthalate is prepolymerized in the presence of a radical polymerization initiator until the refractive index ($n_D$) at 20° C. reaches a value below 1.525, and then a mixture comprising the resulting prepolymerizate, a comonomer represented by the general formula (1) or (2), and radical polymerization initiators are charged into a lens mold to allow the mixture to polymerize and cure, forming a cast lens. If the prepolymerization is allowed to proceed to a point at which the refractive index exceeds 1.525, the workability in the casting process becomes inferior. The prepolymerization of the dimethallyl phthalate is carried out preferably under an inert atmosphere. In the method of manufacturing the plastic lens, it is, of course, preferable to use 70 to 99 parts by weight of the prepolymerizate and 30 to 1 parts by weight of a monomer represented by the general formula (1) or (2).

The radical polymerization initiators used according to this invention are not specific but can be any of the known organic peroxides such as, for example, benzoyl peroxide, diisopropyl peroxydicarbonate, tertbutyl peroxyisobutyrate, 1,1-di-tert-butylperoxy-3,3,5-trimethyl cyclohexane, bis(4-tert-butylcyclohexyl)-peroxydicarbonate, and azo compounds such as, for example, azobisisobutyronitrile. The initiators are used preferably in an amount in the range of from 0.1 to 5 parts by weight for 100 parts by weight of the sum of dimethallyl phthalate or the prepolymerizate, and the comonomer.

EXAMPLES

The invention is illustrated in detail in the following with reference to Examples in which all parts are by weight.

EXAMPLE 1

Into 100 parts of dimethallyl o-phthalate (boiling point 166° C./1.5 mmHg) having a refractive index of 1.511 (20° C.), which was synthesized from methallyl chloride and potassium o-phthalate, were dissolved 2.5 parts of diisopropyl peroxydicarbonate and 0.5 part of benzoyl peroxide. The resulting mixture was poured into a mold composed of glass members for molding a lens of 65 mm in diameter and a polyethylene gasket. The filled mold was held at 50° C. for 20 hours, then at 80° C. for 4 hours, and finally at 100° C. for 4 hours. The polymer was removed from the mold and tested for refractive index, visible light transmission, grinding processability, and dyeability. The results obtained were as shown in Table 1. The polymer obtained was in the form of colorless, transparent lens having a refractive index of 1.565. The refractive index was measured by means of Abbe refractometer; other performance characteristics were tested in the following manner.

Processability: The molded lenses were ground by a grinding machine designed to process eyeglass lenses. Sample bearing smooth ground surfaces were judged acceptable and marked by circles (o).

Dyeability: A suspension of 1.5 g of Sumikaron Blue E-FBL (Product of Sumitomo Chemical Co.) in 1 liter of water was used as dyeing bath. The cast lenses were dipped in the bath at 80° C. for 5 minutes. The polymer was rated as eligible when the dyeability was equivalent to that of a polymer of CR-39 alone.

The rating (mark) shown in the Tables was as follows:
o Eligible
Δ Inferior to some degrees
x Defective

EXAMPLE 2

Lenses were obtained in the same manner as in Example 1, except that dimethallyl isophthalate (boiling point: 150° C./1 mmHg) was used in place of the dimethallyl o-phthalate. The results obtained were as shown in Table 1.

EXAMPLE 3

A mixture comprising 95 parts of dimethallyl o-phthalate, 5 parts of phenoxyethyl methacrylate, 2.5 parts of diisopropyl peroxydicarbonate, and 0.5 part of benzoyl peroxide was cast-polymerized in the same manner as in Example 1 to obtain a lens which showed performance characteristics as shown in Table 1.

EXAMPLE 4

A lens was obtained in the same manner as in Example 3, except that benzyl methacrylate was used in place of the phenoxyethyl methacrylate. The performance characteristics of the lens were as shown in Table 1.

EXAMPLE 5

A lens was obtained in the same manner as in Example 3, except that phenyl methacrylate was used in place of the phenoxyethyl methacrylate. The performance characteristics of the lens were as shown in Table 1.

EXAMPLE 6

Into a 1-liter flask, were charged 500 parts of dimethallyl o-phthalate and 4 parts of diisopropyl peroxydicarbonate. The mixture was heated at 70° C. for 90 minutes under a nitrogen stream to carry out prepolymerization. The prepolymerizate showed a refractive index ($n_D$) of 1.520 which remained unchanged after one month of storage at room temperature, indicating excellent stability of the prepolymerizate. In a manner similar to that in Example 1, a lens was manufactured on experimental basis by cast-polymerizing a mixture of 95 parts of the above prepolymerizate, 5 parts of phenoxyethyl methacrylate, 2.5 parts of diisopropyl peroxydicarbonate, and 0.5 part of benzoyl peroxide. The performance characteristics of said lens were as shown in Table 1.

EXAMPLE 7

A lens was manufactured in the same manner as in Example 3, except that triethylene glycol dimethacrylate was used in place of the phenoxyethyl methacrylate. The performance characteristics of the lens were as shown in Table 1.

COMPARATIVE EXAMPLE 1

A lens was manufactured in the same manner as in Example 1, except that CR-39 was used in place of the dimethallyl o-phthalate. The performance characteristics of the lens were as shown in Table 2.

COMPARATIVE EXAMPLE 2

A lens was cast in the same manner as in Example 1, except that 2,2-bis(4-methacryloyloxyethoxyphenyl)-propane was used in place of dimethallyl o-phthalate. The performance characteristics of the lens were as shown in Table 2.

COMPARATIVE EXAMPLE 3

A lens was manufactured in the same manner as in Example 1, except that diallyl phthalate was used in place of dimethallyl o-phthalate. The performance characteristics of the lens were as shown in Table 2.

COMPARATIVE EXAMPLE 4

A lens was injection molded from commercial polymethyl methacrylate. The results of evaluation of the lens were as shown in Table 2.

TABLE 1

| Example No. | Refractive index | Hardness | Color | Visible light transmission | Grinding processability | Dyeability |
|---|---|---|---|---|---|---|
| 1 | 1.565 | 4H | Colorless | 92 | ○ | △ |
| 2 | 1.571 | 5H | " | 91 | ○ | △ |
| 3 | 1.563 | 4H | " | 92 | ○ | ○ |
| 4 | 1.564 | 4H | " | 92 | ○ | ○ |
| 5 | 1.565 | 4H | " | 90 | ○ | ○ |
| 6 | 1.563 | 4H | " | 93 | ○ | ○ |
| 7 | 1.561 | 4H | " | 92 | ○ | ○ |

TABLE 2

| Comparative Example No. | Refractive index | Hardness | Color | Visible light transmission | Grinding processability | Dyeability |
|---|---|---|---|---|---|---|
| 1 | 1.500 | 2H | Colorless | 90 | ○ | ○ |
| 2 | 1.549 | 3H | Yellow | 83 | ○ | X |
| 3 | 1.563 | 4H | Yellow | 81 | ○ | X |
| 4 | 1.490 | H | Colorless | 91 | X | ○ |

EXAMPLE 8

Dimethallyl o-phthalate, the prepolymerizate of dimethallyl o-phtalate obtained in Example 6, CR-39, and diallyl phthalate were tested for the heat of polymerization and the polymerization shrinkage by means of a differential scanning calorimeter and from the specific gravity measurement, respectively. The polymerization was carried out under the same conditions as in Example 1. The results obtained were as shown in Table 3. As is apparent from the results, compared with CR-39, the plastic lens material of this invention is smaller in both heat of polymerization and polymerization shrinkage.

TABLE 3

| | Heat of polymerization (cal/mole) | Polymerization shrinkage (%) |
|---|---|---|
| Dimethallyl o-phthalate | 15.5 | 11.8 |
| Prepolymer of dimethallyl o-phthalate | 14.0 | 10.1 |
| CR-39 | 39.5 | 13.8 |
| Diallyl o-phthalate | 36.2 | 12.1 |

What is claimed is:

1. A plastic lens comprising a polymer (B) containing a dimethallyl phthalate (A) as a major component and having a refractive index of not less than 1.55, wherein the polymer (B) is a colorless copolymer comprising 70 to 99% by weight of a dimethallyl phthalate and 30 to 1% by weight of one or more monomers ($C_1$) represented by the general formula

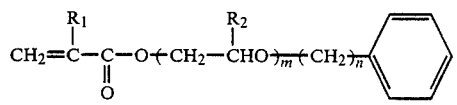

wherein $R_1$ and $R_2$ each represent a hydrogen atom or methyl group and m and n each represent an integer from 0 to 3.

2. A plastic lens according to claim 1, wherein the dimethallyl phthalate (A) is dimethallyl o-phthalate.

3. A plastic lens according to claim 1, wherein the monomer ($C_1$) is phenoxyethyl methacrylate.

4. A plastic lens according to claim 1, which has a visible light transmission of 90% or above, a pencil test hardness of 4H or above, is colorless, and excellent in processability and dyeability.

5. A method for manufacturing a plastic lens of high refractive index, which comprises a step of prepolymerizing dimethallyl phthalate (A) in the presence of a radical polymerization initiator to a point at which the refractive index ($n_D$ at 20° C.) still remains below 1.520, and a succeeding step of pouring into a lens mold a mixture comprising the prepolymerizate (D) obtained in the preceding step, one or more monomers (C₁) represented by the general formula

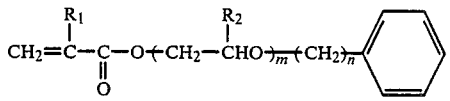

wherein $R_1$ and $R_2$ each represent a hydrogen atom or methyl group and m and n each represent an integer from 0 to 3, and a radical polymerization initiator to allow the mixture to polymerize therein, whereby a colorless copolymer comprising 70 to 99% by weight of the prepolymerizate and 30 to 1% by weight of the monomers is formed.

6. A method for manufacturing a plastic lens according to claim 5, wherein a mixture comprising 70-99 parts by weight of the prepolymerizate (D), 30-1 parts by weight of the monomer or monomers (C₁) represented by the general formula (1), and 0.1-5 parts by weight of the radical polymerization initiator is used in the latter step.

7. A plastic lens, comprising a polymer (B) containing a dimethallyl phthalate (A) as a major component and having a refractive index of not less than 1.55, wherein the polymer (B) is a colorless copolymer comprising 70 to 99% by weight of the dimethallyl phthalate (A) and 30 to 1% by weight of one or more monomers (C₂) represented by the general formula

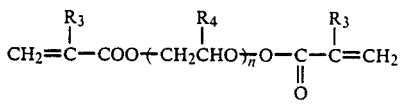

wherein $R_3$ and $R_4$ each represent a hydrogen atom or methyl group and n represents an integer of from 2 to 9.

8. A plastic lens according to claim 7, which has a visible light transmission of at least 90%, a pencil test hardness of 4H or above, is colorless, and excellent in processability and dyeability.

9. A method for manufacturing a plastic lens of high refractive index, which comprises a step of prepolymerizing dimethallyl phthalate (A) in the presence of a radical polymerization initiator to a point at which the refractive index ($n_D$ at 20° C.) still remains below 1.520, and a succeeding step of pouring into a lens mold a mixture comprising the prepolymerizate (D) obtained in the preceding step, one or more monomers (C₂) represented by the general formula

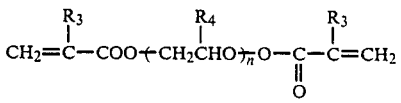

wherein $R_3$ and $R_4$ each represent a hydrogen atom or methyl group and n represents an integer of from 2 to 9, and a radical polymerization initiator to allow the mixture to polymerize therein, whereby a colorless copolymer comprising 70 to 99% by weight of the prepolymerizate and 30 to 1% of the monomers is formed.

10. A method for manufacturing a plastic lens according to claim 9, wherein a mixture comprising 70-99 parts by weight of the prepolymerizate (D), 30-1 parts by weight of the monomer or monomers (C₂) represented by the general formula (2), and 0.1-5 parts by weight of the radical polymerization initiator is used in the latter step.

* * * * *

UNITED STATES PATENT AND TRADEMARK OFFICE
CERTIFICATE OF CORRECTION

PATENT NO. : 4,745,168

DATED : May 17, 1988

INVENTOR(S) : Nakamoto et al

It is certified that error appears in the above-identified patent and that said Letters Patent is hereby corrected as shown below:

Title page, last line of Item (30), "59-20397" should read --59-203297--.

Column 4, line 34, "Sample" should read --Samples--.

Signed and Sealed this

Fifth Day of June, 1990

Attest:

HARRY F. MANBECK, JR.

*Attesting Officer*   *Commissioner of Patents and Trademarks*